(12) United States Patent
Chai

(10) Patent No.: US 6,563,939 B1
(45) Date of Patent: May 13, 2003

(54) ELECTRONIC SIGNATURE VERIFICATION METHOD AND SYSTEM

(75) Inventor: Toshiaki Chai, Tokyo (JP)

(73) Assignee: Cyber SIGN Japan Incorporated, Tokyo (JP)

( * ) Notice: Subject to any disclaimer, the term of this patent is extended or adjusted under 35 U.S.C. 154(b) by 0 days.

(21) Appl. No.: 09/529,428

(22) PCT Filed: Nov. 4, 1998

(86) PCT No.: PCT/JP98/04968
§ 371 (c)(1),
(2), (4) Date: May 3, 2000

(87) PCT Pub. No.: WO99/23608
PCT Pub. Date: May 14, 1999

(30) Foreign Application Priority Data

Nov. 4, 1997 (JP) ............................................. 9/317694

(51) Int. Cl.⁷ ................................................ G06K 9/00
(52) U.S. Cl. ........................ 382/119; 392/209; 340/5.52
(58) Field of Search ................................ 382/115, 119, 382/120, 121, 122, 123; 340/5.82–5.84; 73/865.4; 178/18.01; 348/161

(56) References Cited

U.S. PATENT DOCUMENTS

| | | | | | |
|---|---|---|---|---|---|
| 4,308,522 A | * | 12/1981 | Pagainini et al. | ............ | 382/123 |
| 4,656,662 A | * | 4/1987 | Filliman et al. | ............ | 382/119 |
| 4,985,928 A | * | 1/1991 | Campbell et al. | ............ | 382/119 |
| 5,559,895 A | * | 9/1996 | Lee et al. | ................... | 382/119 |
| 5,680,470 A | * | 10/1997 | Moussa et al. | ............. | 382/119 |
| 5,909,500 A | * | 6/1999 | Moore | ........................ | 382/123 |

FOREIGN PATENT DOCUMENTS

| | | | |
|---|---|---|---|
| JP | 1-28426 | * | 6/1989 |
| JP | 9-27031 | * | 1/1997 |

* cited by examiner

*Primary Examiner*—Samir Ahmed
(74) *Attorney, Agent, or Firm*—Oblon, Spivak, McClelland, Maier & Neustadt, P.C.

(57) ABSTRACT

In an electronic signature verification method, in order to perform optimum verification while coping with variations in signatures of an individual, data of a handwritten character string of a signer are fetched and compared with registration signature data set in advance; and a verification judgment is performed by use of separate regions including a region in which the signature is recognized to be true, a region in which the signature is not recognized to be true, and an intermediate region in which re-signing is requested due to impossibility of judgment. The region in which the signature is recognized to be true and the intermediate region in which re-signing is requested are determined on the basis of the distribution of cumulative errors between the registration signature data and the plurality of signature data sets for registration, such that the region in which the signature is recognized to be true becomes wider when the distribution is wide and becomes narrower when the distribution is narrow and such that the intermediate region becomes wider when the distribution is wide and becomes narrower when the distribution is narrow.

6 Claims, 9 Drawing Sheets

ELECTRONIC SIGNATURE VERIFICATION METHOD AND SYSTEM

BACKGROUND OF THE INVENTION

1. Field of the Invention

The present invention relates to a method of verifying an electronic signature. More particularly, the present invention relates to a method in which a degree of difference (cumulative error) between registered signature data and signature date to be verified is obtained during verification, and a signer is authenticated on the basis of the degree of difference, as well as to a method and apparatus for electronic-tablet correction.

2. Discussion of the Background

A handwritten character recognition method by which written characters are recognized has been utilized as an input method for word processors or a signature verification method for specifying a writer. Under a handwritten character recognition method which has already been in actual use as an input method, characters are input under specified constraints on the style of typeface (e.g., in the style of Kaisho in the case of Japanese), and the thus-input characters are converted into coordinate information. The thus-converted coordinate information is verified by comparison with coordinate information relating to character data which have been stored beforehand. As a result of verification, the characters are recognized as matched. If characters are carefully written in the kaisho style at comparatively slow speed in the manner as previously described, the characters can be sufficiently recognized through use of only coordinate information because under such conditions each of the strokes of the characters becomes clear by virtue of visual feedback to the writer and hence the shape of the characters becomes stable.

In contrast, in a case where the character recognition method is applied to an input method which does not pose any restriction on the style of typeface at the time of input of characters or to a signature verification method, there must be recognized not only characters written in the kaisho style but also cursively written characters. When characters are cursively written, writing motion becomes faster and does not involve any substantial visual feedback to the writer. In this case, the characters become less identifiable, and separation of a resultantly acquired pattern into strokes becomes difficult. Further, due to a large expansion or contraction of the pattern in the direction of the time axis or in the direction of stroke and/or the difference between the input pattern and a pre-registered pattern in these directions, a matching rate is extremely low, rendering recognition of characters difficult.

Another method is to enable recognition of characters without involving the separation of characters into strokes by application of time-series coordinate information and writing pressure. This method employs a pattern matching technique called dynamic programming (DP) matching, which takes into consideration variations in the coordinate information stemming from variations in writing action.

In the DP matching technique, variations in the writing motion are corrected with regard to the time axis or the arc length axis through use of a skew function which minimizes a cumulative error between patterns to be checked. Patterns are matched with each other on the basis of the coordinates and writing pressure that have been corrected so as to compensate variations in the writing motion, thereby enabling recognition of cursively handwritten characters.

Verification based on the addition of writing-pressure information to time-series coordinate information or normalization of input patterns by DP matching contributes to an improvement in the recognition rate of handwritten characters. However, in the case of application of the DP matching technique to recognition of cursively written characters or signature verification, a false signature may be erroneously recognized as a genuine signature. Therefore, in its present form, the DP matching technique cannot be put into practical use.

Japanese Patent No. 1,822,532 [Japanese Patent Publication (kokoku) No. 5-31798] entitled "A Method of Recognizing Handwritten Characters Online" describes a practical technique that is based on DP matching. Under this method, when the degree of difference between a registered pattern and an input pattern of handwritten characters is calculated by use of DP matching, time-series coordinate information and writing-pressure information are simultaneously processed by the assignment of optimum weighting coefficients to the time-series coordinate information and writing-pressure information. As a result, the difference is reduced, which in turn contributes to an improvement in the verification rate of authenticity and a reduction in processing time.

As mentioned previously, even in the case of unclear characters which cannot be separated into strokes, processing of the time-series coordinate information and writing-pressure information relating to handwritten characters enables recognition of the characters. Further, even in the case of cursively handwritten characters, the characters can be recognized in practice, as a result of a further improvement in the DP matching technique that compensates variations in writing motion in order to correct cumulative errors.

In a static signature verification system, an image scanner or an image OCR is used as a tool for reading characters. In contrast, in a dynamic signature verification system, a stylus pen is generally used. An appearance of such a dynamic signature verification system utilizing a stylus pen is shown. When characters are written on a tablet through use of a stylus pen, signals representing characters are sent to a verification section, where signature verification is performed.

Such a tablet and stylus pen are important devices that affect easiness of use. Therefore, recently these devices have been improved. For example, a tablet formed from a liquid-crystal panel and a wireless stylus pen having no signal cable have come into use. Further, in place of a piece of hardware dedicated to signature verification, a personal computer has come into use. In this case, signature verification is performed by software.

The processing performed in the verification section is composed of three steps; i.e., pre-processing/normalization, character extraction, and recognition/judgment. Information from the stylus pen includes relative coordinates (x, y) relative to the start point of a signature, and writing pressure p.

Since handwritten characters are not necessarily consistent, verification of a signature involves difficulty caused by variation in the direction of writing and in size, and hardware noise. The pre-processing/normalization removes these variations and noise and performs normalization in order to enable comparison with standard character patterns. Specifically, in the pre-processing, there are performed removal of excess series of points (sampling based on amount of relative movement), removal of random noise that depends on hand shake and resolution of a tablet (smoothing through load shift), removal of isolated data caused by erroneous operation of the tablet, and like operations. After completion of such pre-processing, the size and position of input characters are normalized. Subsequent to the above-described processing, characteristics of the characters are extracted, and recognition/judgment processing is performed.

The above-described method for verifying electronic signatures is realistic and practical. However, such signature verification involves many drawbacks to be solved. One of the drawbacks is that a signature is not necessarily consistent.

Handwriting of a signature varies depending on the mental state of the person signing and the circumstances under which the person signs. How can we authenticate a person while absorbing such variations? How can we avoid a possibility that a third person whose imitates the handwriting of a certain person is authenticated as the certain person? These difficulties result in two types of errors in relation to signature verification; i.e., an error in which a certain person is judged to be another person (exclusion of the true person) and an error in which a person other than a certain person is judged to be the certain person (authentication of another person).

In signature verification, a person inputs signature data by signing on an electronic tablet by use of an electronic pen, which data are collated with previously registered signature data of the person by means of DP matching. However, since only the shape of a signature is collated in conventional signature verification schemes, characteristics of an electronic tablet and an electronic pen (hereinafter referred to as a "signing device") have not been taken into consideration.

The size, inclination, etc., of characters are not affected by the characteristics of the signing device, because corresponding input signature data are normalized. However, because the handwriting of a signature is easily imitated in shape, signature verification on the basis of only shape is not safe. One method for solving such a problem is addition of writing-pressure information to shape information. Writing pressure cannot be determined from the appearance of a signature and depends on characteristics of a signer. Writing pressure is difficult for other persons to imitate. Thus, combined use of writing-pressure information and shape information enables stricter authentication of a person.

In such case, differences in characteristics among signing devices cause a problem. Although no problem arises when the same signing device is used, a problem arises in the current multimedia environment in which each person uses a signing device of a different manufacturer. In this case, writing-pressure information varies depending on the type of a signing device. In an exemplary case in which a person uses a signing device A for inputting registration signature data serving as a reference for signature verification and uses a signing device B for inputting signature data to be verified, the signing devices A and B output different writing-pressure information even when the person has signed with the same force. Therefore, writing-pressure information—which is employed because of inherent difficulty in imitation by other persons—excludes a true person as well as other persons.

An object of the present invention is to provide a method which solves the above-described problems and enables stable signature verification which provides a higher matching or verification rate.

SUMMARY OF THE INVENTION

In order to solve the above-described problem, preparation of registration signature data, input of signature data to be verified (verification signature data), and verification taking into consideration characteristics of a signing device (an electronic pen or an electronic tablet) are performed in the following manner.

That is, there is provided an electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true and a region in which the signature is not recognized to be true. When the signer sets the registration signature data, the registration signature data are set, by appropriate means, from a plurality of signature data sets for registration. The region in which the signature is recognized to be true is determined on the basis of the distribution of cumulative errors between the registration signature data and the plurality of signature data sets for registration, such that the region in which the signature is recognized to be true becomes wider when the distribution is wide and becomes narrower when the distribution is narrow.

There is further provided an electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment. The intermediate region in which re-signing is requested is determined on the basis of the distribution of cumulative errors between the registration signature data and the plurality of signature data sets for registration, such that the intermediate region becomes wider when the distribution is wide and becomes narrower when the distribution is narrow.

The above-described two methods are combined so as to provide an electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, wherein the region in which the signature is recognized to be true and the intermediate region in which re-signing is requested are determined on the basis of the distribution of cumulative errors between the registration signature data and the plurality of signature data sets for registration, such that the region in which the signature is recognized to be true becomes wider when the distribution is wide and becomes narrower when the distribution is narrow and such that the intermediate region becomes wider when the distribution is wide and becomes narrower when the distribution is narrow.

Further, in the above-described methods, data of a handwritten character string of a signer and signature data sets for registration may be corrected on the basis of correction information for each of different signing devices in order to absorb differences among the input devices.

As described above, when signature data are to be registered, a person signs a plurality of times by use of a signing device. The thus-obtained data are fetched as time-series signature data including writing pressure information; characteristics which are peculiar to the signer and necessary for personal authentication are extracted in order to create registration signature data; and the thus-created registration signature data are registered in a master file. At this time, the registration signature data are collated again with a plurality of signature data sets to obtain cumulative errors (degree of difference). On the basis of the distribution of errors, a security level and a gray zone (intermediate region) corresponding to the stability of signatures of the signer are determined and registered. Further, at this time, writing-pressure information—which varies depends on the type of a signing device used—is converted into writing-pressure information of a signing device serving as a reference, in order to obtain correction information for each of different signing devices. The thus-obtained correction information is registered.

In the signature verification of the present invention, the sum of absolute values of differences between coordinate values contained in registration signature data and coordinate values contained in verification signature data is calculated and the values are averaged so as to obtain an error for each sample point. The thus-obtained error is called a cumulative error (degree of difference). On the basis of the degree of difference, a judgment is made as to whether a signature is a true signature (i.e., a signer is recognized to be a true person)) or not a true signature (i.e., the signer is rejected as a person other than the true person).

At this time, a relatively high clear line is set for a person who signs at high stability, and a relatively low clear line is set for a person who signs at low stability. This clear line is called a "true-person exclusion line." The lower the set value of the true-person exclusion line, the higher the security level that can be obtained; and the higher the set value of true-person exclusion line, the lower the security level that can be obtained. Data for the above-described signature verification are stored for each person and can be retrieved at the time of verification.

Figure 1:
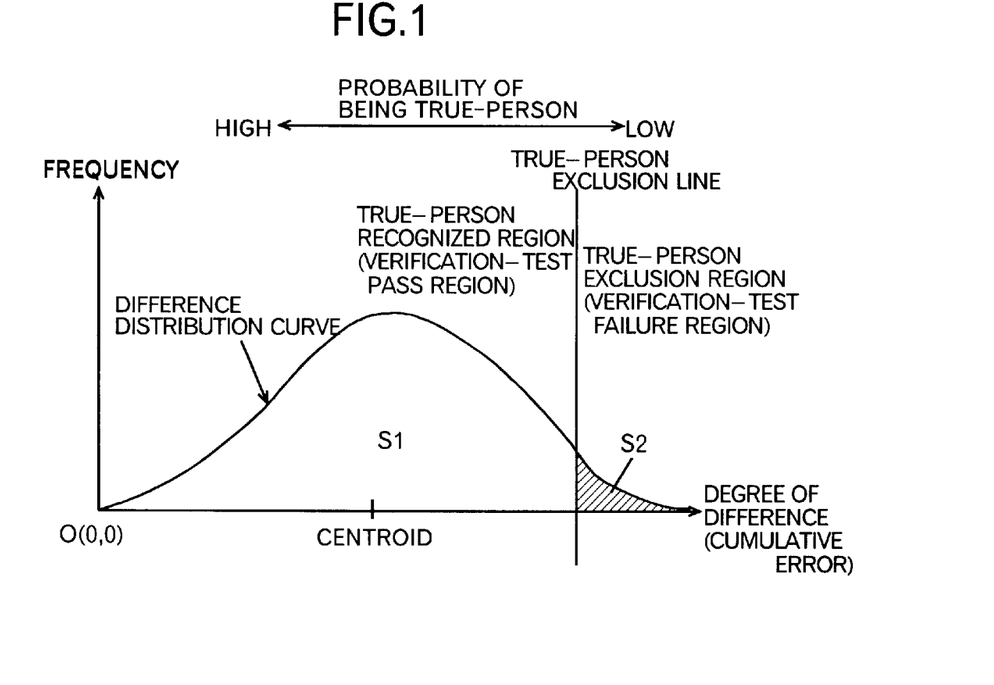
FIG. 1 is a graph used for description of a cumulative error frequency distribution (difference distribution) and a true-person exclusion line in the Means to Solve the Problems section.

FIG. 1 is a diagram showing a cumulative-error frequency distribution and a true-person exclusion line. The horizontal axis of the coordinate system represents the degree of difference (cumulative error) in which the higher the value, the lower the probability of a signer being a true person, or the lower the value, the higher the probability of a signer being a true person. The origin O (0, 0) of the coordinate system is a reference point representing registration signature data themselves. When the degree of difference between verification signature data and registration signature data becomes zero, the verification signature data are judged to be identical with the registration signature data.

A curve representing the cumulative-error frequency distribution (hereinafter referred to as a "difference distribution curve") is normalized such that the area below the curve equals 1. A point which bisects the area below the curve is a centroid and is typically located in the vicinity of a position corresponding to the peak of the curve. When the area of a region on the left side of the true-person exclusion line is represented by $S_1$, and the area of a region (hatched portion) on the right side of the true-person exclusion line is represented by $S_2$, a probability r of a true person being excluded can be obtained as follows:

$$r = S_2/(S_1 + S_2)$$
$$= S_2, \text{ because } S_1 + S_2 = 1.$$

That is, a true person is recognized not to be a true person at the probability r. Although the difference distribution varies among persons, the true-person exclusion line can be drawn such that the probability r becomes constant, thereby enabling each of stable and unstable signers to be recognized as a true person at a constant probability. However, in a simple scheme in which a signer is recognized to be another person on the right side of the true-person exclusion line and is recognized to be a true person on the left side of the true-person exclusion line, there is a high risk that a signature of a person having a relatively low security level is imitated by other persons.

Figure 2:
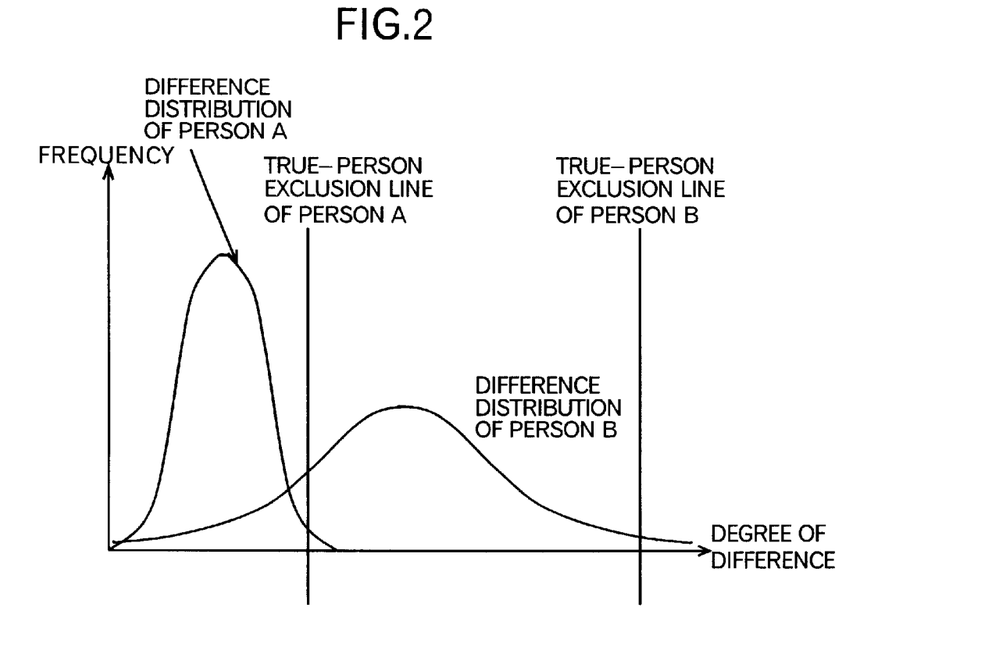
FIG. 2 is a graph used for description of a relationship between stability in signing and a true-person exclusion line in the Means to Solve the Problems section.

FIG. 2 shows a difference distribution of person A who can sign stably and a difference distribution of person B who cannot sign stably. In the case of this example, in order to increase the signature matching rate of person B, the true-person exclusion line for person B is drawn such that the area of the region on the left side of the true-person exclusion line becomes wider. This increases the possibility that any other person who imitates a signature of the true person is recognized to be the true person. Accordingly, there is a risk that other persons cannot be excluded by mere use of a true-person exclusion line—which is introduced in order to increase the probability of a true person being authenticated and which takes security level into consideration.

Figure 3:
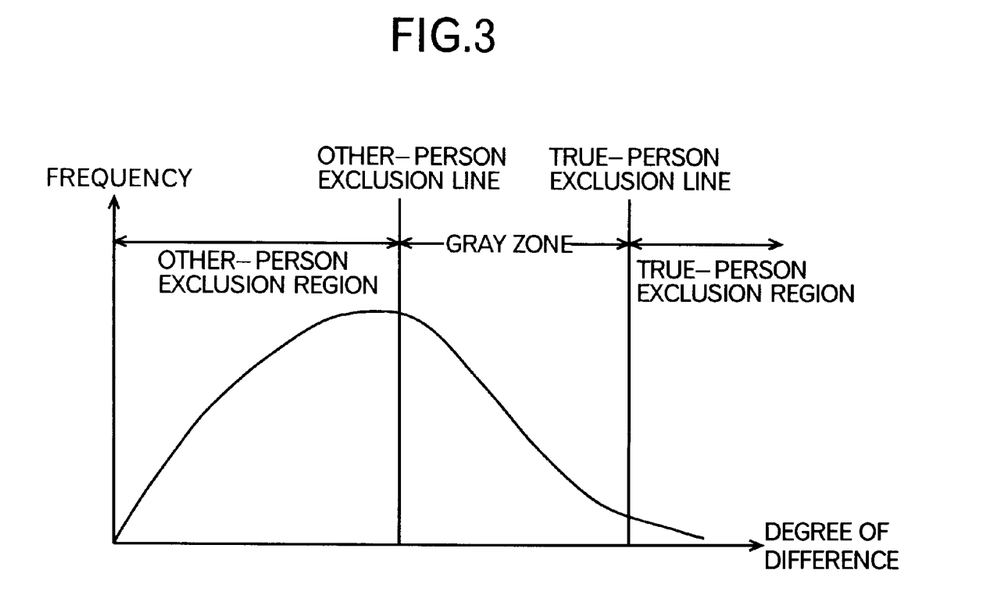
FIG. 3 is a graph used for description of a relationship between a true-person exclusion line and an other-person exclusion line, as well as a gray zone, in the Means to Solve the Problems section.

In order to solve this problem, the present invention employs an other-person exclusion line. FIG. 3 shows the relationship between an other-person exclusion line and a true-person exclusion line. A region sandwiched between the two lines is called a gray zone. In FIG. 3, a region on the right side of the true-person exclusion line is called a true-person exclusion region. When a result of signature verification indicates that a cumulative error (degree of difference) falls within the true-person exclusion region, the signature is recognized to be signed by a person other than the true person, even if the true person has signed.

Figure 4:
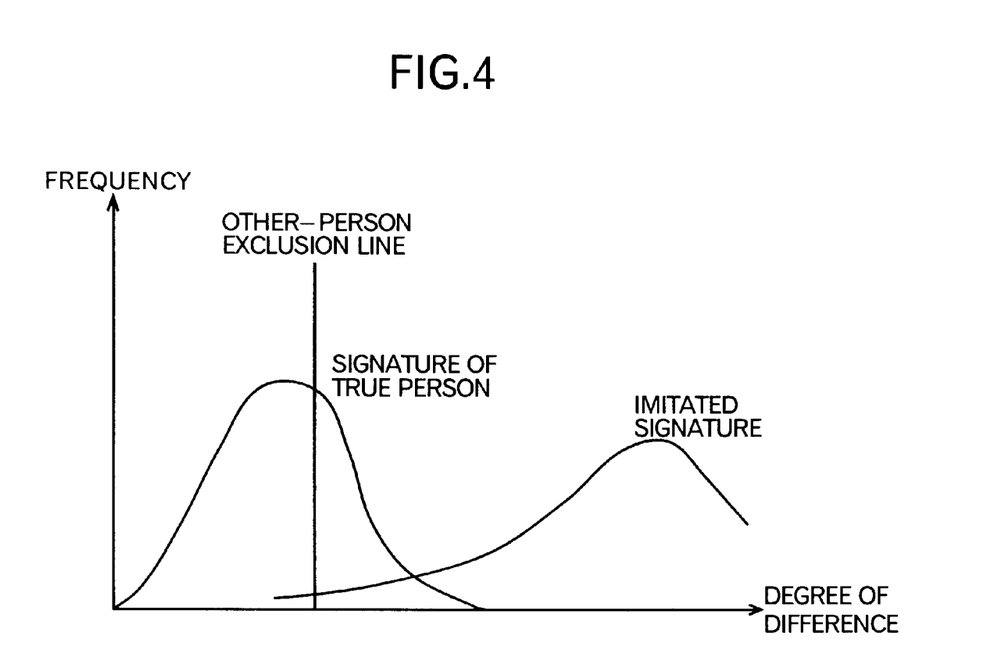
FIG. 4 is a graph used for description of the merit of presence of a true-person exclusion line in the Means to Solve the Problems section.

Meanwhile, a region on the left side of the other-person exclusion line is called an other-person exclusion region, because signatures whose cumulative errors fall within this region can rarely be imitated by other persons. When the cumulative error falls within this region, the signer is determined to be a true person. The meaning of exclusion of other person will become clear upon reference to FIG. 4, which shows a difference distribution for the case in which a person other than the true person signs. In the graph of FIG. 4, although the value of frequency does not reach zero even on the left side of the other-person exclusion line, the value indicated by time-series signature data including writing-pressure information becomes substantially zero.

The gray zone sandwiched between the true-person exclusion line and the other-person exclusion line is a vague area in which it is impossible to judge whether a true person signed or a person other than the true person signed. When a result of signature verification indicates that the degree of difference falls within the gray zone, re-signing is requested, and signature verification is performed again for the new signature. On the basis of a result of the signature verification, a signer is judged to be a true person or a person other than the true person. For example, when the result of the signature verification for the new signature indicates that the degree of difference falls within the other-person exclusion region, the signer is recognized to be the true person, and when the result indicates that the degree of difference falls within the true-person exclusion region, the signer is recognized to be another person. When the degree of difference again falls within the gray zone, a judgment is automatically performed again. In this case, the signer is preferably judged to be another person if importance is placed on strictness.

The present invention employs a method for performing total judgment by use of a concept of security level and a concept of gray zone in a related manner such that the judgment for the gray zone is changed in accordance with the security level. This point will be described in detail in relation to an embodiment.

In the above-discussion, passage or failure of a verification test (whether the signer is a true person or not) is determined on the basis of a region in which the degree of difference falls. However, the following point must be considered in relation to verification signature data. Since writing-pressure information varies depending on the performance of an electronic pen or electronic tablet used for signing, differences in input characteristics must be corrected in the case in which verification signature data include not only shape but also writing pressure, as in the present invention.

Figure 5:
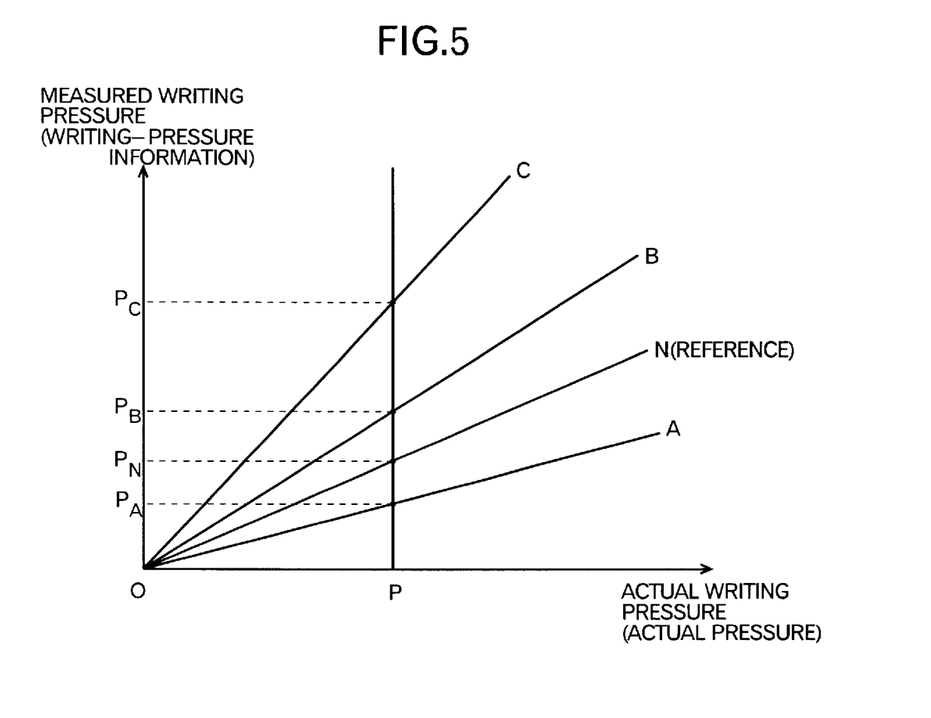
FIG. 5 is a graph used for description of tablet correction in the Means to Solve the Problems section.

In general, as shown in FIG. 5, a proportional relationship exists between actual writing pressure and measured writing pressure as read from an electronic pen or electronic tablet. When electronic tablets or pens A, B, and C output measured writing pressures $p_A$, $p_B$, and $p_C$, respectively, for actual writing pressures p, correction values $\alpha_A$, $\alpha_B$, and $\alpha_C$ for the measured writing pressures $p_A$, $p_B$, and $p_C$ with respect to a measured writing pressure $p_N$ from a reference electronic tablet or pen N are represented as follows:

$$\alpha_A = p_A / p_N$$
$$\alpha_B = p_B / p_N$$
$$\alpha_C = p_c / p_N$$

When the relationship between actual writing pressure and measured writing pressures can be approximated by use of straight lines as shown in FIG. 5 and the lines pass through the origin O, the correction value $\alpha$ is constant regardless of the value of p. Therefore, measured writing pressure can be corrected by use of a correction value obtained from the above expressions. That is, when a writing pressure Ps which is applied on an electronic pen or tablet S at a certain time and which is represented by verification signature data is represented as follows:

$$PS=(x_{st}, y_{st}, p_{st})$$

a corrected writing pressure Ps' is represented as follows:

$$Ps'=(x_{st}, y_{st}, p_{st} \cdot \alpha_S)$$

Accordingly, when corrected verification signature data Ps' are compared with corrected registration signature data, verification can be performed without regard to the type of an electronic tablet or pen to be used. In the following description, unless otherwise specified, the term "writing pressure" means measured writing pressure (writing-pressure information). Although correction is performed for measured writing pressure output from an electronic tablet or an electronic pen, in the following description such correction will be simply referred to as "tablet correction."

The above-described tablet correction assumes that the relationship between actual writing pressure and measured writing pressure can be approximated by use of a straight line. However, when a tablet whose characteristics cannot be approximated by use of a straight line is used, a curved-line approximation or a correction table may be used. However, the basic concept is the same as in the case of straight-line approximation.

BRIEF DESCRIPTION OF THE DRAWINGS

A more complete appreciation of the present invention, and many of the attendant advantages thereof, will be more readily obtained as the same becomes better understood by reference to the following detailed description when considered in connection with the following drawings, in which.

DESCRIPTION OF THE PREFERRED EMBODIMENTS

Handwritten character recognition according to the present invention involves acquisition of coordinate information and writing-pressure information relating to characters to be verified; and arithmetic processing of these sets of information. To this end, there are needed means for measuring the coordinate information and writing-pressure information relating to handwritten characters, and arithmetic processing means for processing the thus-obtained sample data. The coordinate information and writing-pressure information measured by sampling the written characters at preset time intervals take the form of three-dimensional time-series data. However, these sets of information are preferably represented as data series comprising complex coordinate series and writing pressure series. The means for measuring the coordinate information and writing-pressure information comprises, e.g., a stylus pen having a built-in pressure sensor, and a digitizer for detecting the coordinates of the tip end of the pen.

With regard to the characters used as the standards for verification and characters to be collated, data are obtained by means of sampling coordinate information and writing speed information at equal time intervals. The thus-obtained data are normalized to correspond to an equal number of sampling points and are further preliminarily normalized with regard to position and size. For example, in the case of lateral writing action, in many cases a pen is moved from left to right. Such constant motion may hinder verification of the characters. For this reason, it is desirable to calculate a uniform stroke component from the pattern and to subtract the thus-obtained uniform stroke component from the coordinate information normalized with regard to position and size.

Figure 6:
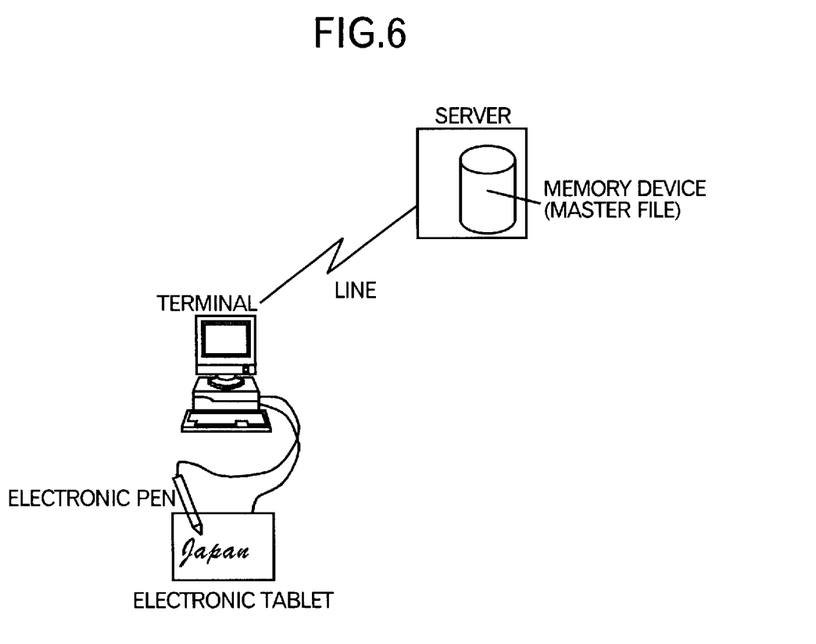
FIG. 6 shows an exemplary structure of hardware used in an embodiment of the present invention.

In the present invention, setting of registration signature data is performed as follows. Writing-pressure information is obtained from an electronic tablet of a pressure-sensing type and is registered in a server (see FIG. 6) connected to a terminal via a communication line. Signature verification is performed in the server, and one or more correction values for respective tablets are measured in advance and registered in a master file in the form of a constant value (in the case of a single constant correction value being used) or in the form of a table (in the case of different correction values being used).

When registration signature data are set, a person who wishes to resister his signature signs a plurality of times in order to create registration signature data.

Subsequently, there are performed the steps of:
(1) averaging the plurality of signature data sets for registration in order to calculate a candidate set of registration signature data;
(2) collating the candidate set of registration signature data with each signature data set for registration;
(3) when no unacceptable discrepancy is found as a result of verification between the candidate set of registration signature data and the signature data sets for registration, treating the candidate set of registration signature data as registration signature data; and
(4) when at least one unacceptable discrepancy is found as the result of verification between the candidate set of registration signature data and the signature data sets for registration, repeating steps (1) and (2) in order to find a candidate set of registration signature data for which no unacceptable discrepancy is found as a result of verification with the signature data sets for registration, and treating the candidate set of registration signature data as registration signature data.

Instead of the above-described method in which data creation is repeated until a desired result is obtained, there can be employed a method comprising the steps of:
(1) averaging a plurality of signature data sets in order to calculate a candidate set of registration signature data;
(2) collating the candidate set of registration signature data with each signature data set for registration;
(3) when no unacceptable discrepancy is found as a result of verification between the candidate set of registration signature data and the signature data sets for registration, treating the candidate set of registration signature data as registration signature data; and
(4) when at least one unacceptable discrepancy is found as a result of verification between the candidate set of registration signature data and the signature data sets for registration, inputting an additional signature data set for registration; forming a plurality of groups each consisting of signature data sets for registration selected from the increased number of signature data sets for registration such that the number of signature data sets for registration in each group is less than the total number of signature data sets for registration; collating with each signature data set for registration a candidate set of registration signature data that is obtained by averaging the signature data sets in each group; and treating, as registration signature data, the candidate set of registration signature data of the group that produces the best verification result.

The registration signature data may be registered as they are or may be registered together with the type of tablet used. In the former case, signature data are corrected by use of a correction value determined with respect to a reference tablet, and the thus-corrected data are registered as the registration signature data. Therefore, correction of the registration signature data during verification processing is not required. In the latter case, during the verification processing, the registration signature data are corrected by use of a correction value corresponding to the type of the tablet. The former case is generally used for registration.

Figure 7:
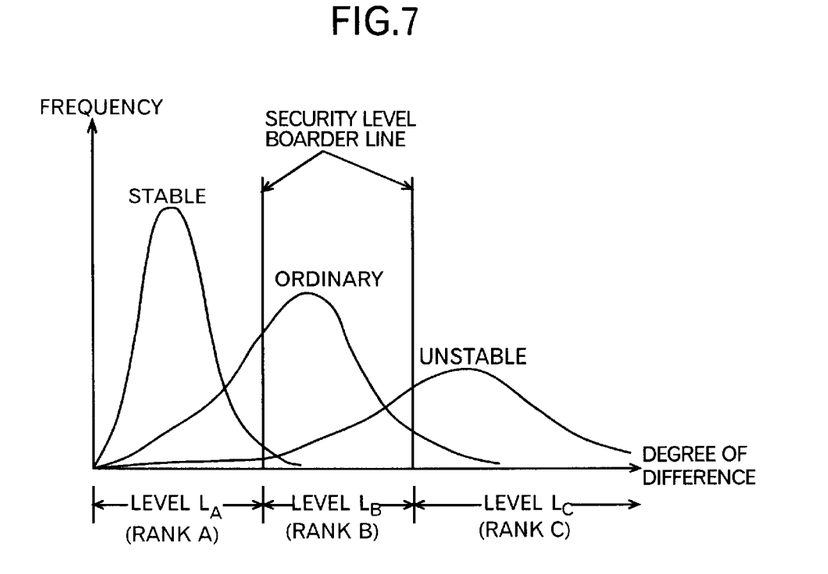
FIG. 7 is a graph used for description of a method for determining a rank in accordance with security level in the embodiment of the invention.

At the same time, a difference distribution (cumulative error distribution) is measured, and a true-person exclusion line and an other-person exclusion line are determined and registered. Further, as shown in FIG. 7, one of three security levels $L_A$, $L_B$, and $L_C$ is set in accordance with the value of the true-person exclusion line. Signatures of a person whose true-person exclusion line falls within the level $L_A$ are judged to be highly stable and are categorized in rank A; signatures of a person whose true-person exclusion line falls within the level $L_B$ are categorized in rank B; and signatures of a person whose true-person exclusion line falls within the level $L_C$ are categorized in rank C. This operation is called ranking on the basis of security level.

Next, signature verification will be described. The signature verification is performed on the basis of a cumulative error between the verification signature data and the registration signature data. Calculation for the signature verification is performed in the following manner.

Cumulative error D (sum of normalized degrees of difference (in the present invention, simply called "degree of difference")) is calculated by use of the following Equations 1 and 2. Equation 1 represents the degree of difference between the m-th character of registration signature data A and the corresponding character of verification signature data set B.

$$d_s^2(m) = \frac{\sum_{k=Ls(m)}^{Le(m)} \{(1-w_p) \cdot |z_A^*(k) - z_B^*(\tau(k))|^2 + w_p \cdot |p_A^*(k) - p_B^*(\tau(k))|^2\}}{Le(m) - Ls(m) + 1} \qquad \text{Eq. 1}$$

Equation 2 represents the overall degree of difference of the signature; i.e., a normalized degree of difference obtained through a calculation in which the sum of the degrees of difference for the respective characters is divided by the total number of data points in the characters.

$$D(A, B) = \frac{\sum_{k=1}^{M} d_s(m) \cdot (Le(m) - Ls(m) + 1)}{\sum_{k=1}^{M} (Le(m) - Ls(m) + 1)} \quad \text{Eq. 2}$$

where $L_s(m)$, $L_e(m)$ respectively represent the start and end points of the m-th character, M represents the number of characters, $w_p$ represents a weighting coefficient, $\tau(k)$ represents a skew function at the k-th sample point of the m-th character, and z* and p* respectively represent normalized positional coordinates and a normalized writing pressure coordinate. The coefficient $w_p$ satisfies the following relation:

$$0 \leq w_p \leq 1.$$

Through adjustment of this coefficient, the effect of writing-pressure information on authentication judgment is varied.

Further, z* represents the following complex coordinates:

$$z^* = x^* + iy^*$$

$i = SQRT(-1)$ (the square root of $-1$).

The skew function $\tau$ is a function for minimizing the cumulative error of handwritten signature data. The positional coordinates and writing pressure coordinate of the signature data B corrected by use of this function are $z^*_B(\tau(k))$ and $p^*_B(\tau(k))$. In other words, the cumulative error can be minimized through selection of a coordinate point $\{(z^*_B(\tau(k)), p^*_B(\tau(k))\}$ of the signature data B that corresponds to a coordinate point $\{(z^*_A(\tau(k)), p^*_A(\tau(k))\}$ of the signature data A. Each of the writing-pressure information $p^*_A(\tau(k))$ and the writing-pressure information $p^*_B(\tau(k))$ used here is a value subjected to tablet correction.

Figure 8:
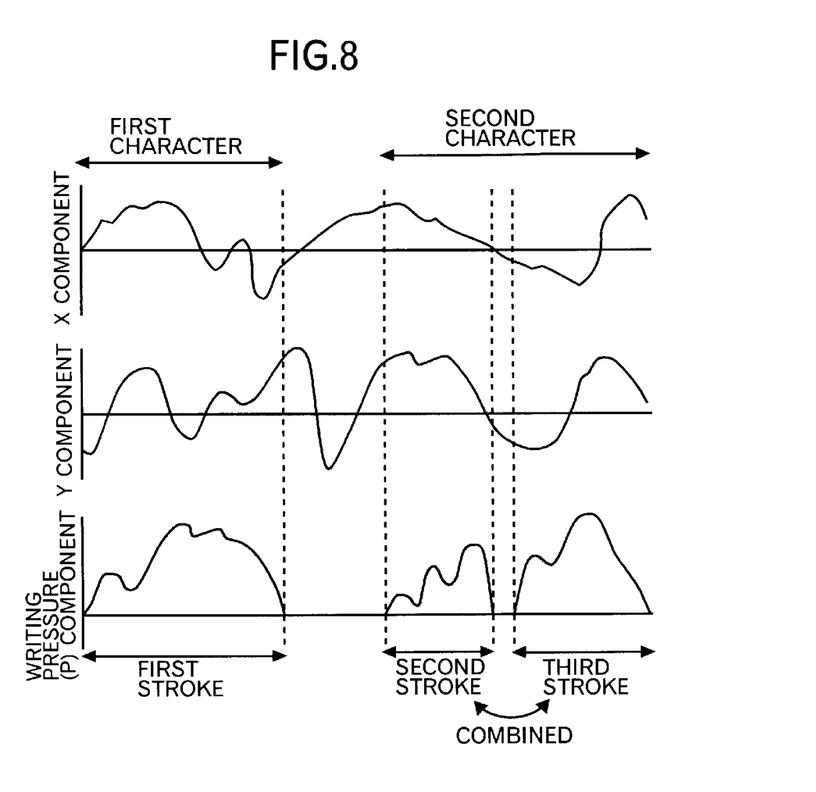
FIG. 8 is a diagram used for description of a method for separating characters on the basis of writing-pressure information in the embodiment of the invention.

The number of characters can be obtained from the writing-pressure information, an example of which is shown in FIG. 8. As shown in FIG. 8, characters are separated from one another while a portion where the writing pressure P becomes zero is used as a separation point. However, when the distance between adjacent strokes (e.g., second and third strokes of the second character) is less than a predetermined value, the two strokes are regarded as belonging to a single character. The start and end points of each section obtained through separation of characters are $L_s$ and $L_e$, respectively, and coordinates (including the pressure component) are provided for each section.

Figure 9:
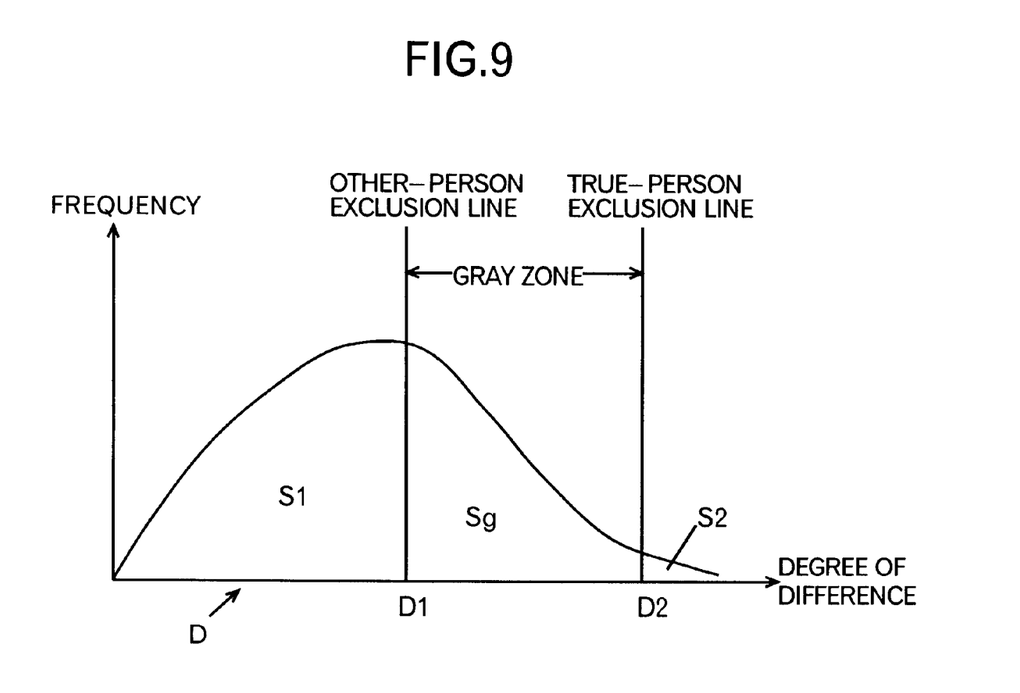
FIG. 9 is a graph related to the embodiment of the invention and used for description of a relationship between the number of times of signing and a probability at which the degree of difference successively falls within the gray zone.

Next, the method for signature verification will be described. In the following description, as shown in FIG. 9, the degree of difference of an other-person exclusion line is represented by $D_1$; the degree of difference of a true-person exclusion line is represented by $D_2$; the degree of difference of verification signature data is represented by D; and security level is divided into level $L_A$ or rank A, level $L_B$ or rank B, and level $L_C$ or rank C (see FIG. 7). Basically, regardless of security level, judgment is performed as follows.

When $D < D_1$, a signer is recognized as a true person (passes a verification test).

When $D > D_2$, a signer is recognized as another person (fails the verification test).

The above judgment is natural from the viewpoint of the purpose of the other-person exclusion line and the true-person exclusion line. However, signatures falling in the gray zone are treated in one of different manners in accordance with situation and purpose. For example, the gray zone has different meanings for persons having different security levels. That is, in the case of a person having a high security level (a person in rank A in the above-described definition), since the gray zone itself is present in a region which is hardly invaded or the person's signature is less likely to be imitated, the gray zone itself can be regarded a true-person recognition region. By contrast, in the case of a person having a low security level (a person in rank C in the above-described definition), the gray zone is a region which the person's signature is easily imitated, and is therefore regarded an other-person recognition region in situations which require strictness.

In view of the above, re-signing is requested when D is not less than $D_1$ and not greater than $D_2$, and verification is performed again for a newly input signature. In this verification, judgment is made in the following manner, depending on the security rank (i.e., rank A, B, or C). When the degree of difference of the newly input signature is represented by D, judgment is performed as follows, regardless of security level.

When $D < D_1$, a signer is recognized as a true person (passes a verification test).

When $D > D_2$, a signer is recognized as another person (fails the verification test).

However, when $D_1 \leq D \leq D_2$; i.e., when D falls within the gray zone, different judgment criteria are set for a person whose security level is rank A, a person whose security level is rank B, and a person whose security level is rank C.

(1) For a person whose security level is rank A:
   if $D_1 \leq D \leq D_2$, the person is recognized as a true person.
(2) For a person whose security level is rank B:
   if $D_1 \leq D \leq D_1 + (D_2 - D_1)/2$, the person is recognized as a true person; and if not, the system entrusts an operator to make judgment as to, for example, whether re-signing must be requested.
(3) For a person whose security level is rank C:
   the system always entrusts an operator to make judgment as to, for example, whether re-signing must be requested.

In the above-described example, an ambiguous expression "entrusting an operator" is used. However, such operation may be performed mechanically such that when a value of D falls within the gray zone, the signer is repeatedly requested to sign; and when the value of D enters either the true-person exclusion region (in which the signer is determined to be another person) or the other-person exclusion region (in which the signer is determined to be a true person), a judgment is made as to whether the signer is the true person or a person other than the true person.

Figure 10:
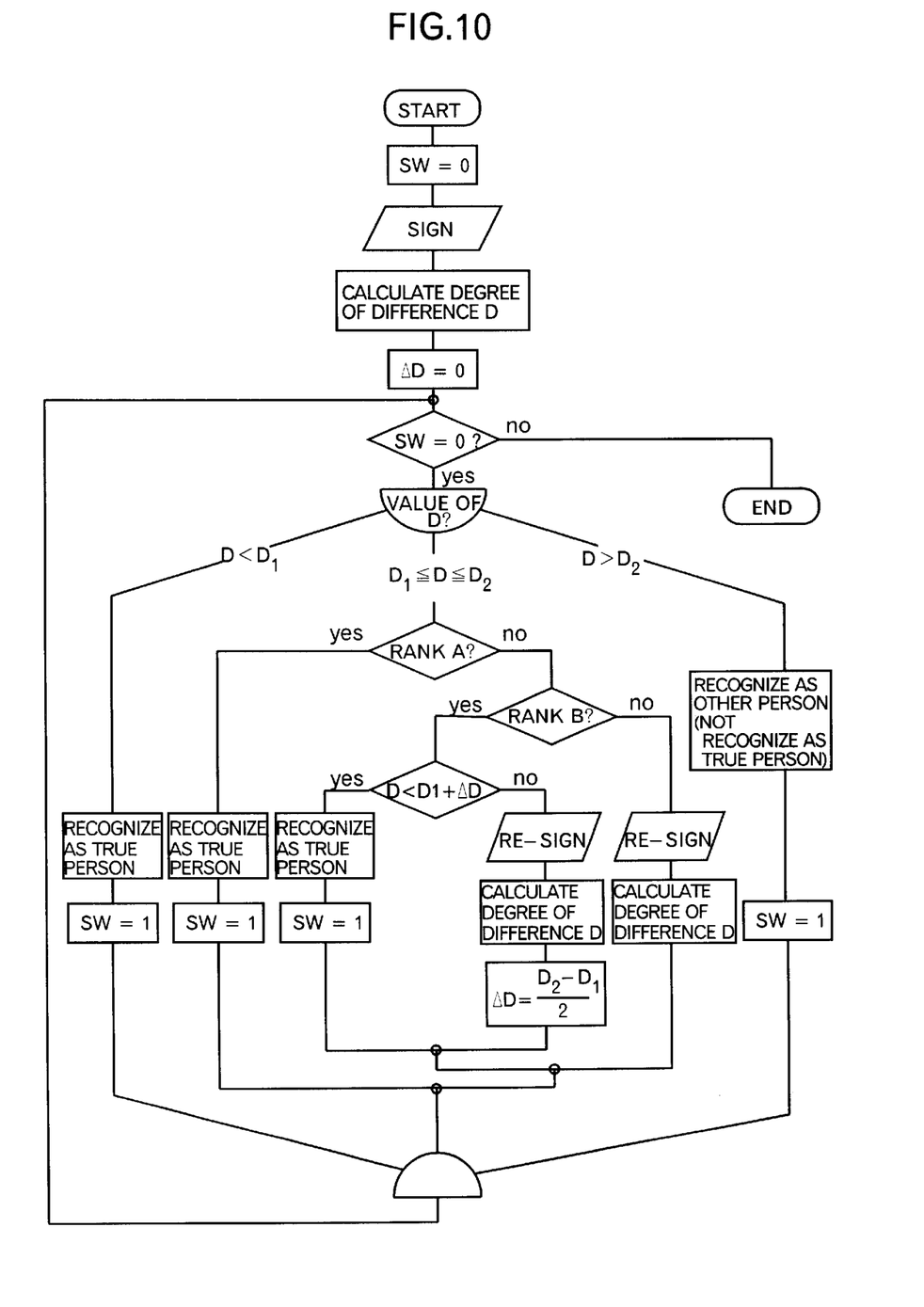
FIG. 10 is a flowchart showing signature verification processing performed in the embodiment of the invention.

That is, mechanical judgment can be performed by means of a judgment method shown in the flowchart of FIG. 10. It is assumed that ranks have been determined at the time of creation of registration signature data (but may be modified later). The flowchart shows processing which embodies the above-described method. The processing will be described in a summarized manner.

For a person whose security level is rank A (a highly stable signer), the gray zone is regarded an other-person exclusion region (in which the signer is determined to be a true person) to thereby lower the pass level of the verification test.

For a person whose security level is rank B (an intermediately stable signer), the value of the other-person exclusion line is increased to $D_1 + (D_2 - D_1)/2$ to thereby increase matching rate. However, the signer is requested to re-sign repeatedly until the inequality $D<D_1$ or $D>D_2$ is attained.

For a person whose security level is rank C (unstable signer), the signer is requested to re-sign repeatedly until the inequality $D<D_1$ or $D>D_2$ is attained.

The reason why the signer is requested to re-sign repeatedly so long as the value of D falls within the gray zone will be described. As shown in FIG. 9, it is assumed that the area of an other-person exclusion region is $S_1$; the area of a gray zone is $S_g$; the area of a true-person exclusion region is $S_2$; and $S_1$, $S_g$, and $S_2$ are normalized such that $S_1+S_g+S_2=1$. In this case, the area $S_n$ (n=1, g, 2) represents the probability of the degree of difference D of verification signature data falling within the corresponding region.

Accordingly, when the gray zone is determined to account for 40% regardless of security level, the probability $S_g^m$ at which all of m sets of verification signature data fall within the gray zone is $0.4^m$. Therefore, when m=4, $S_g^m$ becomes 0.0256, which means that only two of about 100 signatures fall within the gray zone. However, since the other-person exclusion region (in which the signer is determined to be a true person) for each of ranks A and B is widened, the matching rate increases considerably as compared with the case in which judgment is simply made by $D<D_1$. Since the gray zone is widened, the person whose security level is rank C (unstable signer) may be requested to re-sign repeatedly. However, this is important from the viewpoint of necessity of excluding other persons.

Figure 11:
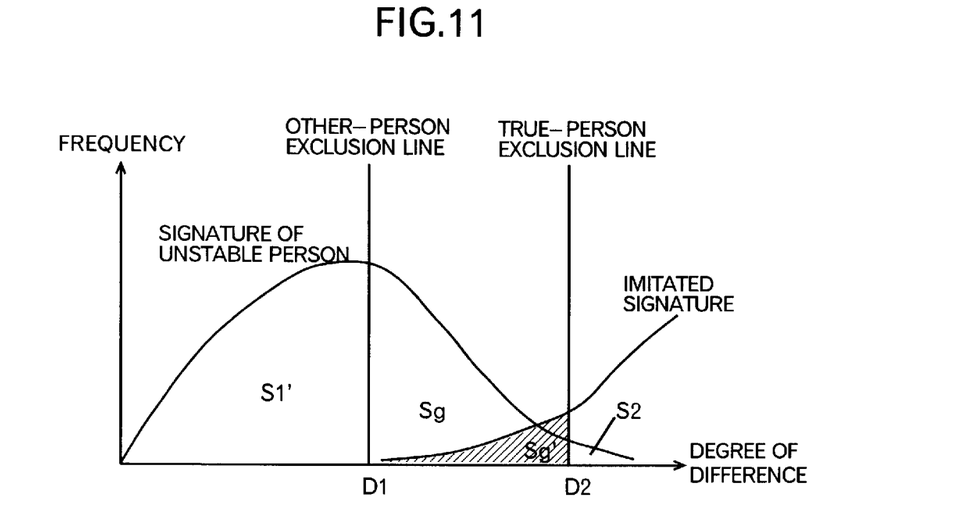
FIG. 11 is a graph related to the embodiment of the invention and used for description of a relationship between the number of times of signing and a probability at which the degree of difference successively falls within the gray zone, for the case in which a person other than a true person imitates the signature of the true person.

As shown in FIG. 11, a signature of a person imitating a signature of an unstable signature falls within the gray zone for the unstable signature at a high probability. When the probability (area) of such an imitated signature falling within the gray zone is represented by $S_g'$, the probability of two imitated signatures falling within the gray zone is represented by $S_g'^2$. When $S_g'=0.05$ (=5%), the probability of two imitated signatures falling within the gray zone is 0.0025, or two signatures among about 1000 signatures. The probability decreases exponentially as the re-signing is repeated. When the present invention utilizing time-series data including writing-pressure information is employed, it becomes considerably difficult for other persons to imitate a registered signature such that an imitated signature is judged to match the registered signature at a probability of 5%. Further, since the probability decreases exponentially as the re-signing is repeated, the possibility at which a person other than a true person is recognized to be the true person is almost zero. This demonstrates the importance of the gray zone.

The manner of treating the gray zone is not limited to the above-described manner, and may be modified in accordance with a field in which signature verification is used and the purpose of signature verification. Such an example will be described as an embodiment of the present invention.

Figure 12:
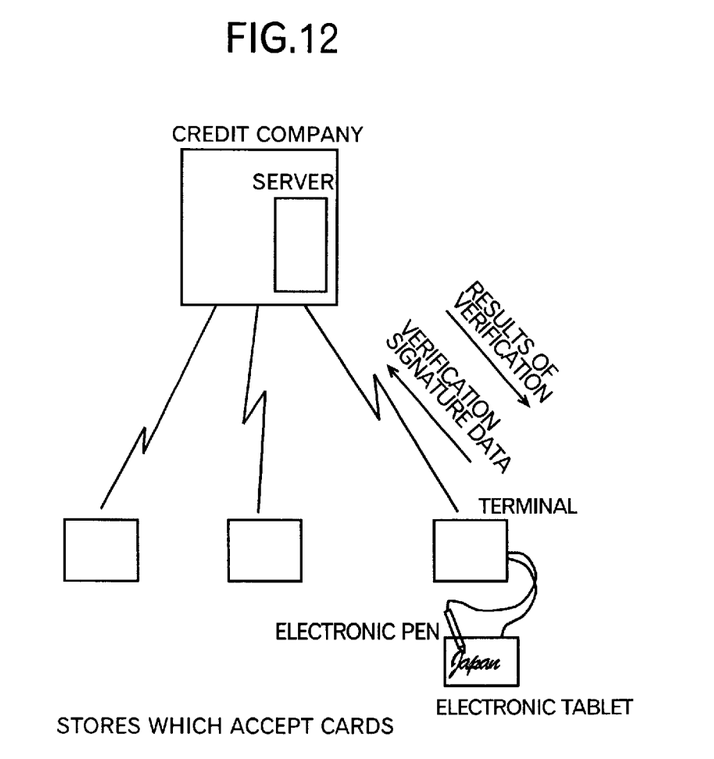
FIG. 12 is a diagram related to the embodiment of the invention and schematically showing an example of a system configuration used for verifying the owner of a credit card through signature verification.

In an example serving as the embodiment of the present invention, signature verification is performed when a customer shops by credit card at a store which accepts credit cards. Registration signature data are registered in a server at the company which has issued the credit card. An electronic tablet of a pressure-sensing type is provided in the store. Signature data are converted into verification signature data at a terminal and are sent to the server via a communication line. FIG. 12 shows the configuration of the system. Different stores may use different types of electronic tablets. However, it is assumed that correction values for different tablets have already been measured and stored in a master file of the server.

When a customer pays for goods or services by used of a credit card, the terminal reads card information from the card. Subsequently, the terminal is connected to the server of the credit company which manages the card, and the server issues a request for an electronic signature. In accordance with the request, the customer signs. Signature data are sent, as verification signature data, to the server and verified therein, and a result of verification is reported to the terminal. On the basis of the verification result, a clerk judges whether the customer can use the card.

Figure 13:
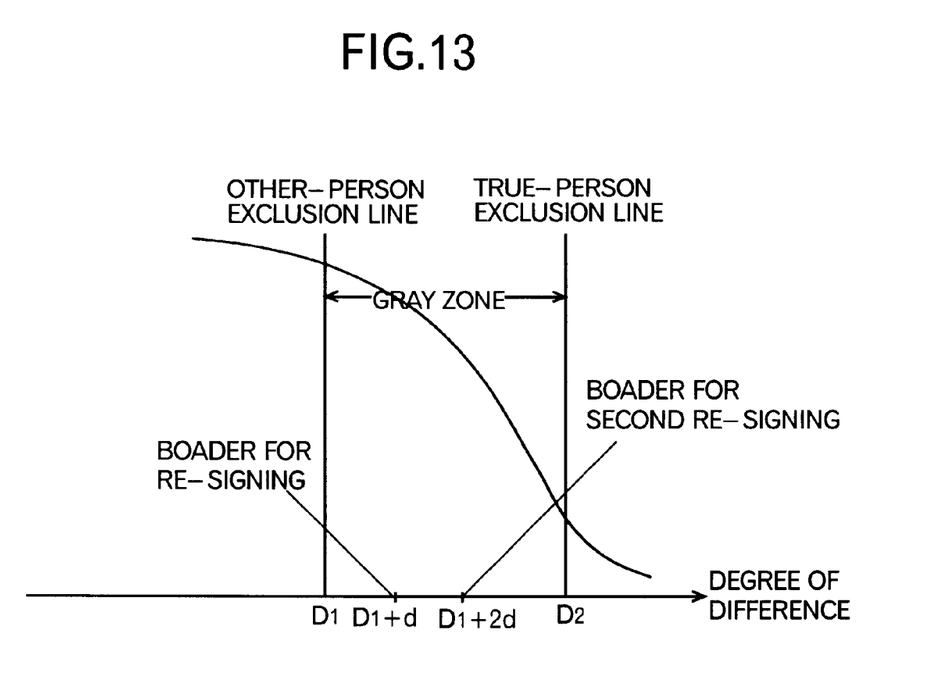
FIG. 13 is a graph related to the embodiment of the invention and used for description of a method of treating the gray zone.

When the verification result indicates that the degree of difference D falls within the other-person exclusion region, the customer is recognized as a true person, and the credit card transaction is permitted. When the verification result indicates that the degree of difference D falls within the true-person exclusion region, the customer is recognized as another person, and the credit card transaction is denied. When the degree of difference D falls within the gray zone, re-signing is requested. When a signature produced as a result of the re-signing is again judged such that its degree of difference falls within the gray zone, re-signing is requested again. When a signature produced as a result of the second re-signing is again judged such that its degree of difference falls within the gray zone, the clerk determines whether the credit card transaction is to be accepted or denied. As described above, the probability of an imitated signature falling within the gray zone decreases exponentially through repeated re-signing. Taking this into consideration, the other-person exclusion region is widened as the number of times of re-signing increases, in order to increase matching rate with respect to the true person while excluding other persons. That is, as shown in FIG. 13, the gray zone is equally divided into three zones, and the other-person exclusion line used for judgment is shifted rightward by d each time re-signing is performed.

Figure 14:
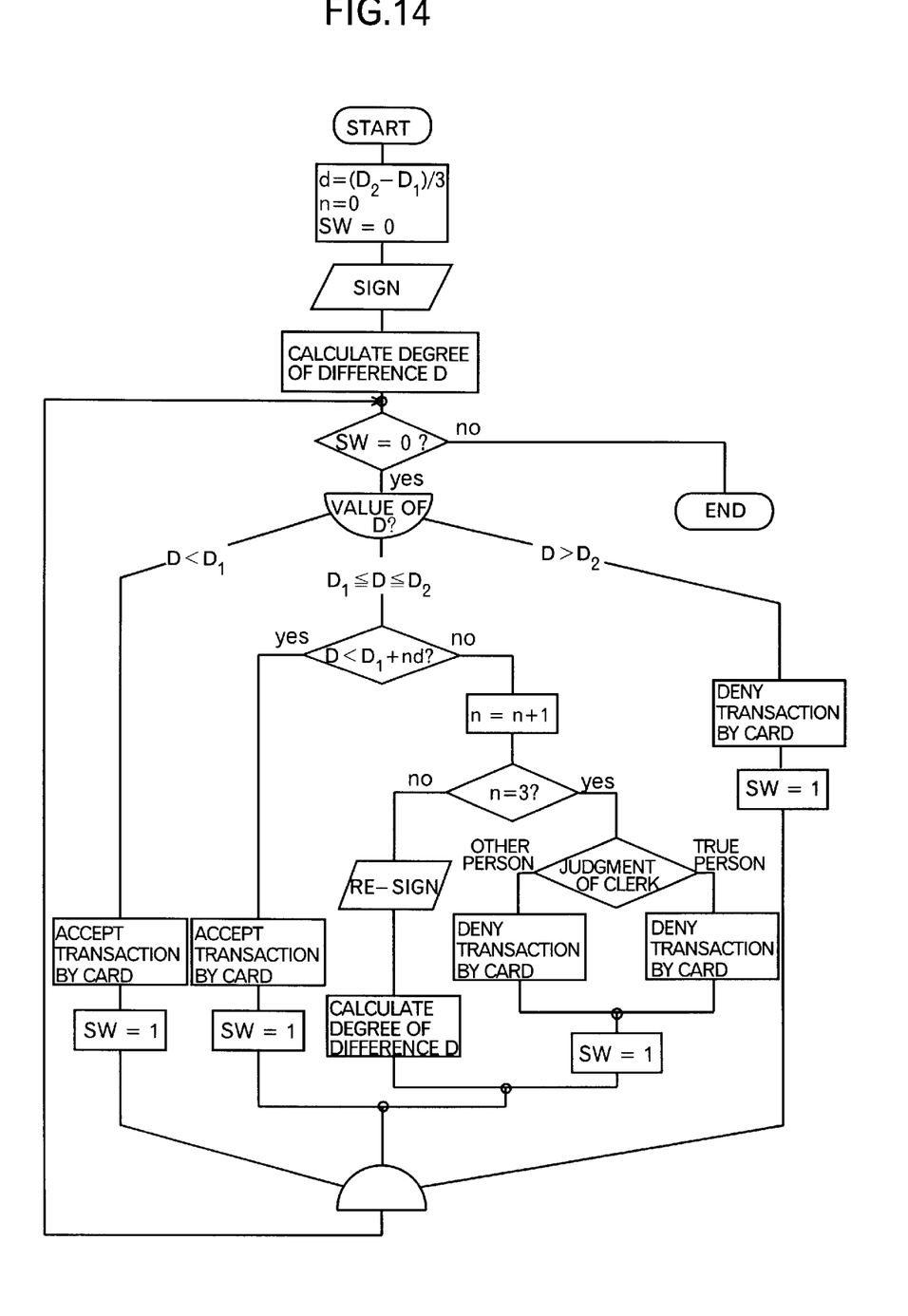
FIG. 14 is a flowchart showing signature verification processing in the embodiment of the invention.

FIG. 14 shows a flowchart of the above-described processing. The processing of FIG. 14 is basically the same as that of FIG. 10 except that ranks of security level are not used; the gray zone is divided into three zones in order to increase matching rate every time re-signing is performed; and the final judgment is entrusted to the clerk. The reason why the final judgment is made by the clerk is as follows. In the case of a stable signer, the probability of passing a verification test in an early stage is high. By contrast, in the case of an unstable signer, his signatures may involve variation greater than that represented by an actual error distribution (difference distribution registered at the beginning). In this case, the probability of the true person being recognized not to be the true person becomes higher than the probability of another person successively imitating the signature in order to illegally use the card. In such case, when the card holder is a regular customer and is familiar to the clerk, or when the card holder can be proven to be a true person by means of his ID card or the like, the customer is judged to be the true owner of the card. This procedure is practical for stores.

In the method used in the present embodiment, security level is taken into consideration only in determining the true-person exclusion line. Therefore, if the gray zone is set to account for the same ratio for a person having a low security level (unstable signer) and for a person having a high security level (stable signer), the degree of difference falls within the gray zone at the same rate regardless of the type of person who signed. This causes a greater problem in relation to true-person exclusion than in relation to other-person exclusion. Accordingly, the manner of judgment may need to be changed in accordance with the type of signer, through the above-described methods, such as a method in which ranking is performed according to security level and a method in which, for a stable signer the other-person exclusion line is shifted toward the true-person exclusion line in order to narrow the gray zone to thereby widen the true-person recognition region.

Since the gray zone employed in the present invention is considered to be a fuzzy portion, the gray zone may vary depending on the field in which signature verification is used and the purpose of signature verification. For example, when signature verification is used to control entry into a laboratory having a high level of confidentiality, judgment is preferably performed mechanically as in the example mentioned in the embodiment. By contrast, when a credit card is used at a store having a clerk who can personally identify customers in many cases, there is needed a method in which mechanical or automatic judgment is combined with judgment by a human. Especially, in the latter case, provision of a gray zone—which is a fuzzy portion—enables creation of a state in which judgment by a human is performed with ease. However, in this case, it is naturally required that there be devised a method of setting a gray zone, as well as a processing method, in order to reduce situations in which judgment must be made by a human.

In a conventional signature verification technique, judgment as to whether a signer is a true person or not has been performed on the basis of the absolute value of a cumulative error (a cumulative error value which is constant regardless of the stability of signatures). Such a conventional method involves a problem in that a person who cannot sign stably (an unstable signer) is not recognized to be a true person. When an attempt is made to increase the overall matching rate, a line which is set for a person who can sign stably (a stable signer) and which prevents other persons from imitating the signature lowers, causing a security problem. The concept of security level of the present invention has solved these two conflicting problems. That is, the present invention employs a true-person exclusion line which changes depending on security level. Since the true-person exclusion line—which is a pass line (a border line (true-person exclusion line) used for recognition of a true person)—is determined in accordance with the security level or the stability of a signer, matching rate does not depend on the stability of the signer.

However, since the true-person exclusion line for a person having a lower security level (an unstable signer) is set so as to increase the matching rate, it becomes difficult to exclude other persons. In order to solve this problem, the present invention employs the concept of combined use of an other-person exclusion line and a gray zone. The introduction of a gray zone, in which judgment as to whether a signer is a true person or not cannot be performed, enables achievement of two conflicting improvements; i.e., an increase in other-person exclusion rate and an increase in true-person recognition rate.

The conventional signature verification is performed on the basis of shape only. Therefore, the type of an electronic pen or tablet used for signing has not be taken into consideration. By contrast, in the present invention, writing-pressure information is added to factors of signature verification. This writing-pressure information prevents a person other than a true person from imitating a signature of the true person, because writing pressure is information which cannot be obtained through observation of a signature, although the shape of the signature can be obtained visually. The tablet correction according to the present invention is used to correct the writing-pressure information and enables use of the signature verification method of the present invention regardless of the type of electronic pen or tablet to be used.

Accordingly, a user can use a type that the user has grown accustomed to or an inexpensive type. Although the term "tablet correction" is used in the description, it means "correction of writing-pressure information" and encompasses correction for writing-pressure information from an electronic pen and correction for writing-pressure information from an electronic tablet.

What is claimed is:

1. An electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, characterized in that (1) when the signer sets the registration signature data in advance, the registration signature data are set, by appropriate means, from a plurality of signature data sets for registration; and (2) the intermediate region in which re-signing is requested is determined on the basis of the distribution of cumulative errors between the registration signature data and the plurality of signature data sets for registration, such that the intermediate region becomes wider when the distribution is wide and becomes narrower when the distribution is narrow.

2. An electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, characterized in that (1) when the signer sets the registration signature data in advance, the registration signature data are set, by appropriate means, from a plurality of signature data sets for registration; and (2) the region in which the signature is recognized to be true and the intermediate region in which re-signing is requested are determined on the basis of the distribution of cumulative errors between the registration signature data and the plurality of signature data sets for registration, such that the region in which the signature is recognized to be true becomes wider when the distribution is wide and becomes narrower when the distribution is narrow and such that the intermediate region becomes wider when the distribution is wide and becomes narrower when the distribution is narrow.

3. An electronic signature verification system in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, characterized in that (1) when the signer sets the registration signature data in advance, the registration signature data are set, by appropriate means, from a plurality of signature data sets for registration; and (2) the intermediate region in which re-signing is requested is determined on the basis of the distribution of cumulative errors between the registration signature data and the plurality of signature data sets for registration, such that the intermediate region becomes wider when the distribution is wide and becomes narrower when the distribution is narrow.

4. An electronic signature verification system in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, characterized in that (1) when the signer sets the registration signature data in advance, the registration signature data are set, by appropriate means, from a plurality of signature data sets for registration; and (2) the region in which the signature is recognized to be true and the intermediate region in which re-signing is requested are determined on the basis of the distribution of cumulative errors between the registration signature data and the plurality of signature data sets for registration, such that the region in which the signature is recognized to be true becomes wider when the distribution is wide and becomes narrower when the distribution is narrow and such that the intermediate region becomes wider when the distribution is wide and becomes narrower when the distribution is narrow.

5. A recording medium for a computer which stores a program for performing an electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, characterized in that (1) when the signer sets the registration signature data in advance, the registration signature data are set, by appropriate means, from a plurality of signature data sets for registration; and (2) the intermediate region in which re-signing is requested is determined on the basis of the distribution of cumulative errors between the registration signature data and the plurality of signature data sets for registration, such that the intermediate region becomes wider when the distribution is wide and becomes narrower when the distribution is narrow.

6. A recording medium for a computer which stores a program for performing an electronic signature verification method in which data of a handwritten character string of a signer are fetched; registration signature data of the signer set in advance are retrieved; the data of the handwritten character string are compared with the registration signature data; and a verification judgment is performed by use of separate regions including a region in which the signature is recognized to be true, a region in which the signature is not recognized to be true, and an intermediate region in which re-signing is requested due to impossibility of judgment, characterized in that (1) when the signer sets the registration signature data in advance, the registration signature data are set, by appropriate means, from a plurality of signature data sets for registration; and (2) the region in which the signature is recognized to be true and the intermediate region in which re-signing is requested are determined on the basis of the distribution of cumulative errors between the registration signature data and the plurality of signature data sets for registration, such that the region in which the signature is recognized to be true becomes wider when the distribution is wide and becomes narrower when the distribution is narrow and such that the intermediate region becomes wider when the distribution is wide and becomes narrower when the distribution is narrow.

* * * * *